US010666925B2

(12) United States Patent
Rowell et al.

(10) Patent No.: US 10,666,925 B2
(45) Date of Patent: May 26, 2020

(54) STEREOSCOPIC CALIBRATION USING A MULTI-PLANAR CALIBRATION TARGET

(71) Applicants: Adam S Rowell, Palo Alto, CA (US); Sheldon S Fernandes, San Jose, CA (US); Amruta Kulkarni, Blacksburg, VA (US); Han Jin, Milpitas, CA (US)

(72) Inventors: Adam S Rowell, Palo Alto, CA (US); Sheldon S Fernandes, San Jose, CA (US); Amruta Kulkarni, Blacksburg, VA (US); Han Jin, Milpitas, CA (US)

(*) Notice: Subject to any disclaimer, the term of this patent is extended or adjusted under 35 U.S.C. 154(b) by 0 days.

(21) Appl. No.: 15/957,501

(22) Filed: Apr. 19, 2018

(65) Prior Publication Data

US 2019/0132577 A1 May 2, 2019

Related U.S. Application Data

(63) Continuation-in-part of application No. 15/139,328, filed on Apr. 27, 2016, now Pat. No. 10,075,693.

(60) Provisional application No. 62/154,703, filed on Apr. 29, 2015.

(51) Int. Cl.
| H04N 13/246 | (2018.01) |
| H04N 13/178 | (2018.01) |
| H04N 9/82 | (2006.01) |
| H04N 5/77 | (2006.01) |
| H04N 13/189 | (2018.01) |
| H04N 13/257 | (2018.01) |
| H04N 13/239 | (2018.01) |
| H04N 13/296 | (2018.01) |

(52) U.S. Cl.
CPC ......... *H04N 13/246* (2018.05); *H04N 5/772* (2013.01); *H04N 9/8227* (2013.01); *H04N 13/178* (2018.05); *H04N 13/189* (2018.05); *H04N 13/239* (2018.05); *H04N 13/257* (2018.05); *H04N 13/296* (2018.05)

(58) Field of Classification Search
None
See application file for complete search history.

(56) References Cited

U.S. PATENT DOCUMENTS

| 6,563,499 | B1 * | 5/2003 | Waupotitsch | G06T 11/001 345/420 |
| 6,917,702 | B2 * | 7/2005 | Beardsley | G06T 7/85 345/419 |
| 9,237,329 | B1 * | 1/2016 | Poursohi | G03B 15/00 |
| 9,602,806 | B1 * | 3/2017 | Stafford | H04N 13/243 13/243 |
| 2004/0008772 | A1 * | 1/2004 | Kojima | H04N 5/232 375/240.08 |
| 2004/0234122 | A1 * | 11/2004 | Kochi | G01B 11/24 382/154 |
| 2008/0298674 | A1 * | 12/2008 | Baker | G06K 9/209 382/154 |

(Continued)

*Primary Examiner* — Fernando Alcon

(57) ABSTRACT

A system of calibrating a multi-camera device that include two or more planar calibration targets, arranged in a non-planar orientation. The system mechanically moves the calibration targets relative to the multi-camera device to change the relative orientation. The system records images with the multi-camera device at various orientations. The recorded images contain one or more of the constituent planar calibration targets. The system identifies and extracts the pixel coordinates of each constituent planar calibration target from each image.

14 Claims, 13 Drawing Sheets

(56) References Cited

U.S. PATENT DOCUMENTS

| | | | | |
|---|---|---|---|---|
| 2011/0304693 A1* | 12/2011 | Border | ............... | H04N 13/221 348/46 |
| 2014/0118503 A1* | 5/2014 | Luo | ............... | H04N 13/246 13/246 |
| 2017/0221210 A1* | 8/2017 | Martinello | ............... | G06T 7/80 |
| 2017/0228864 A1* | 8/2017 | Liu | ............... | G06T 7/80 |

* cited by examiner

STEREOSCOPIC CALIBRATION USING A MULTI-PLANAR CALIBRATION TARGET

CROSS-REFERENCE TO RELATED APPLICATIONS

This application is a claims priority from provisional U.S. Application No. 62/154,703 filed Apr. 29, 2015. This application is hereby incorporated by reference in its entirety. This application is a claims priority from provisional U.S. Application No. 62/328,011 filed Apr. 27, 2016. This application is hereby incorporated by reference in its entirety. This application is a claims priority from provisional U.S. application Ser. No. 15/139,328 filed on Apr. 27, 2016. This application is hereby incorporated by reference in its entirety.

BACKGROUND

Field of the Invention

This invention relates to the calibration process of a stereoscopic camera. In particular, the invention comprises a system and method of calibrating a stereo camera that is more efficient or faster than traditional calibration systems and methods.

Description of Related Art

Stereoscopic, or 3D, cameras generally must be calibrated during the manufacturing process, or at some time after their construction. A stereoscopic camera is comprised of two or more individual camera modules that simultaneously take sets of images or record sets of video streams, instead of just taking a single image or single video stream.

The prior art teaches that the calibration metadata of a stereoscopic camera contains parameters describes each camera module's intrinsic properties, as well as the stereo parameters, which describe the relative orientations of the cameras to each other. During a camera calibration process, the intrinsic parameters are estimated for each individual camera module in the stereoscopic camera, and the stereo are then computed to estimate the orientations.

The prior art also teaches that both non-stereoscopic and stereoscopic camera calibration is often done using a calibration target, which is a known pattern that can be printed or displayed. During the stereoscopic calibration process, a set of images is taken of the calibration targets from various orientations. Software algorithms can then be used to detect the calibration target pattern in each set of captured image frames, and record the coordinates of these patterns. Calibration software is then used to take the positions of the calibration targets in each of the stereoscopic frames and estimate the intrinsic camera calibration parameters of each individual camera module, and estimate the stereo camera parameters.

Many readily available software packages, such as OpenCV, MATLAB, and Vicalib, provide implementations of software algorithms that can find calibration targets in images, and estimate calibration parameters from a set of images of the target. Common calibration patterns are a checkerboard pattern (also known as a chessboard pattern), dots patterns, grid patterns, OR code patterns, and pseudo-random image patterns. These targets are generally planar— that is they are flat patterns that can be printed or displayed on a flat screen.

The prior art teaches that increasing the number of images and orientations of the calibration target used during the calibration process generally helps to improve the calibration accuracy. However, as the number of images increases, the time it takes to capture the images increases, and processing time also increases. Using too many images can make calibration a single camera a time-intensive process. Using too few images can result in poor calibration accuracy or cause the calibration software to fail to find a suitable calibration. Operators of camera calibration software are generally responsible for deciding how many images are used, or images can be continuously taken until a minimum calibration accuracy threshold is achieved.

As different orientations and distance between the camera and calibration target are required for a suitable calibration to be computed, the camera must be moved relative to the calibration target during while collecting calibration images. This movement may be achieved by moving the camera, moving the calibration target, or both. In addition, this movement may be done manually, or done using an automated mechanical system.

The prior art also teaches that once a stereoscopic camera calibration is complete, the result is a set of calibration parameters, which comprises the calibration metadata. These metadata may be stored on the camera or saved by the camera calibration operator.

BRIEF SUMMARY OF THE INVENTION

A system of calibrating a multi-camera device that include two or more planar calibration targets, arranged in a non-planar orientation. The system mechanically moves the calibration targets relative to the multi-camera device to change the relative orientation. The system records images with the multi-camera device at various orientations. The recorded images contain one or more of the constituent planar calibration targets. The system identifies and extracts the pixel coordinates of each constituent planar calibration target from each image.

Figure 1:
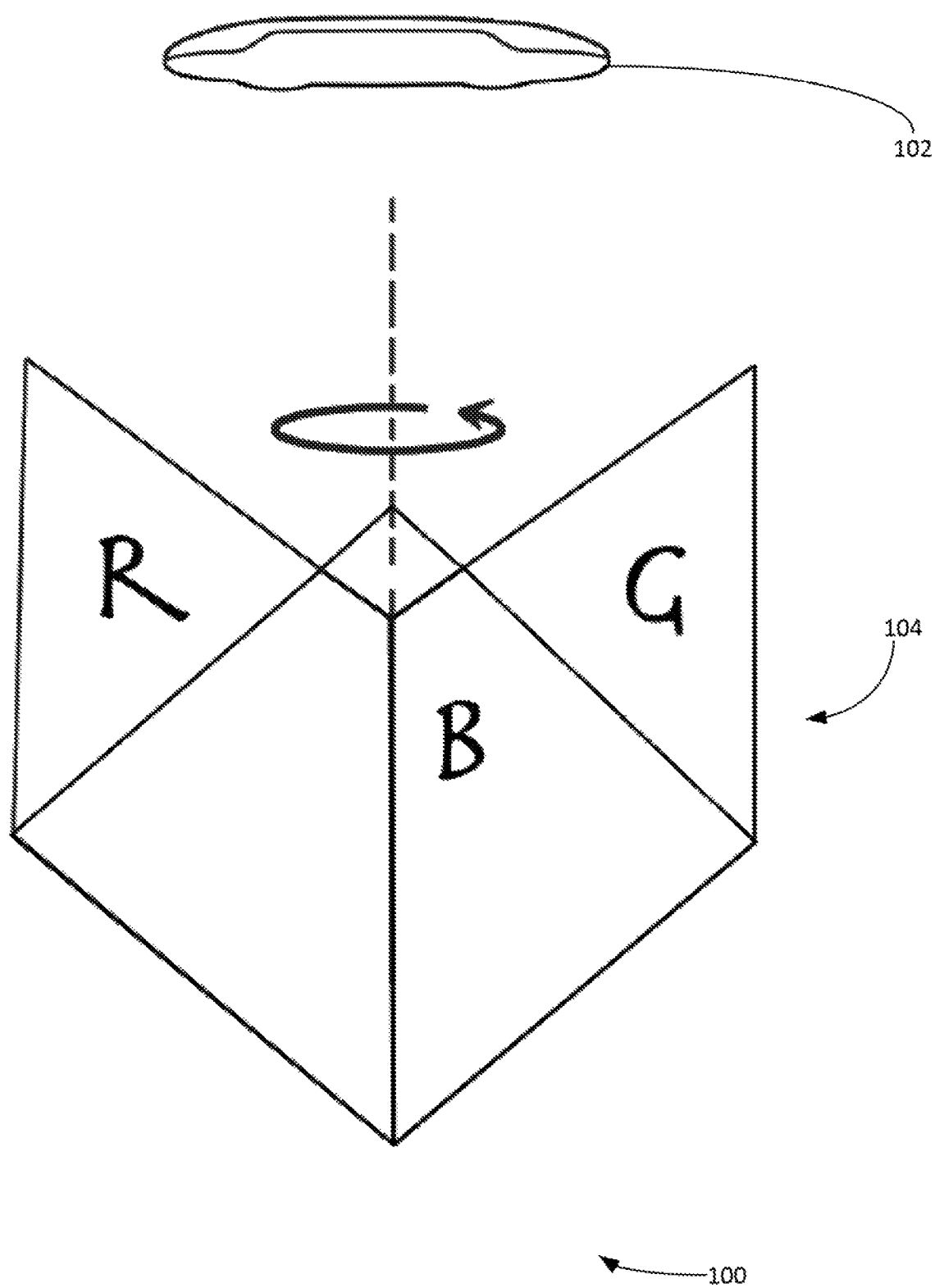
FIG. 1 is a perspective view showing a single multi-camera device being calibrated with a non-planar calibration target, according to some embodiments.

The Figures described above are a representative set and are not an exhaustive with respect to embodying the invention.

DESCRIPTION

Disclosed are a system, method, and article of manufacture for stereoscopic calibration using a multi-planar calibration target. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Example definitions for some embodiments are now provided.

3-D audio can be a group of sound effects that manipulate the sound produced by stereo speakers, surround-sound speakers, speaker-arrays, or headphones.

Three-dimensional stereoscopic video (3D film video) can a digital motion picture that enhances the illusion of depth perception, hence adding a third dimension.

Fisheye cameras can utilize an ultra-wide-angle lens that produces a visual distortion intended to create a wide panoramic or hemispherical image.

Head-mounted display (or helmet-mounted display, for aviation applications), both abbreviated HMD, is a display device, worn on the head.

HSL (Hue, Saturation, Lightness) and HSV (Hue, Saturation, Value) are two alternative representations of the RGB color model, designed in the 1970s by computer graphics researchers to more closely align with the way human vision perceives color-making attributes. In these models, colors of each hue are arranged in a radial slice, around a central axis of neutral colors which ranges from black at the bottom to white at the top. The HSV representation models the way paints of different colors mix together, with the saturation dimension resembling various shades of brightly colored paint, and the value dimension resembling the mixture of those paints with varying amounts of black or white paint. The HSL model attempts to resemble more perceptual color models such as NCS or Munsell, placing fully saturated colors around a circle at a lightness value of ½, where a lightness value of 0 or 1 is fully black or white, respectively.

Inertial measurement unit (IMU) can be an electronic device that measures and reports a body's specific force, angular rate, and/or the magnetic field surrounding the body, using a combination of accelerometers and gyroscopes, sometimes also magnetometers.

MPEG-4 Part 14 (MP4) is a digital multimedia format most commonly used to store video and audio, but can also be used to store other data.

RGB color model is an additive color model in which red, green and blue light are added together in various ways to reproduce a broad array of colors.

Stereoscopy can be a technique for creating or enhancing the illusion of depth in an image by means of stereopsis for binocular vision. Stereoscopic video can be coded in various processing stages used to manifest stereoscopic content. Various techniques can be used to achieve stereoscopic video, inter alia: color shifting (e.g. anaglyph, etc.); pixel subsampling (e.g. side-by-side, checkerboard, quincunx, etc.); enhanced video stream coding (e.g. 2D+Delta, 2D+Metadata, 2D plus depth, etc.); etc.

Universal Serial Bus (USB) can be a protocol that define the cables, connectors and communications protocols used in a bus for connection, communication and/or power supply between computers and electronic devices.

Virtual Reality (VR) can include immersive multimedia that replicates an environment that simulates physical presence in places in the real world or imagined worlds.

YUV is a color encoding system typically used as part of a color image pipeline. It encodes a color image or video taking human perception into account, allowing reduced bandwidth for chrominance components, thereby typically enabling transmission errors or compression artifacts to be more efficiently masked by the human perception than using a "direct" RGB-representation. Other color encodings have similar properties, and the main reason to implement or investigate properties of Y'UV would be for interfacing with analog or digital television or photographic equipment that conforms to certain Y'UV standards.

Example Embodiments

The subject invention comprises a system and method of calibrating a multiple-camera device, such as a stereoscopic camera, using a non-planar calibration target. The invention employs two or more planar calibration targets, which are arranged in a fixed, non-planar fashion, and which can be distinguished by identifying characteristics or markers. In addition, the invention employs a method to perform multi-camera calibration, wherein multiple images of the non-planar calibration target are taken, image processing and/or software is used to identify as many of the constituent planar calibration targets as possible within each calibration image, and software is used to estimate the calibration metadata of the multi-camera rig. The invention may optionally include a means of mechanically moving the camera and/or non-planar calibration target relative to the other, so as to automate the collection of different calibration images from different orientations. In addition, the invention may optionally include a means to calibrate more than one multi-camera device simultaneously. The subject invention increases the efficiency and/or speed of a multi-camera device's calibration process.

Example Processes

FIG. 1 illustrates an embodiment of the invention where a multi-camera device is being calibrated using a non-planar calibration target 104. The multi-camera device 102 in this embodiment is a stereoscopic camera (e.g. see FIGS. 6-9 infra), which has two camera modules within the device. This embodiment contains the single camera in a fixed position, a non-planar calibration target 104 consisting of three constituent planar calibration targets, and a mechanical platform that rotates the calibration target 104 about a fixed axis.

In this embodiment, the multi-camera device 102 can be configured to capture stereoscopic images periodically as the calibration target 104 rotates about its axis. The rotation causes a relative change in orientation between the target and the camera as images are recorded.

From each of the recorded images, the three individual planar targets may be identified using computer vision or other image processing algorithms to identify the principal pixel locations within the image, which are feature points used in the calibration process. In some recorded images, not all of the planar targets may be present. Using identifying marks in each planar target, such as color, the planar targets can be told apart and tracked between recorded images.

Using the determined feature pixel coordinates of the constituent planar targets, the stereoscopic calibration can be computed in the same manner as if there was only a single calibration target 104. To do this, the stereoscopic calibration system of this invention treats the three planar targets as if they were all the same target, but at slightly different orientations. In doing so, the stereo calibration algorithm is able to capture multiple orientations in each image capture, and increase the number of target orientations. Stereoscopic calibration algorithms measure the disparity of the image position between the left and right image modules across the corpus of recorded images and use the disparities to compute a stereo calibration.

Multi-Camera Device Calibration

Figure 2:
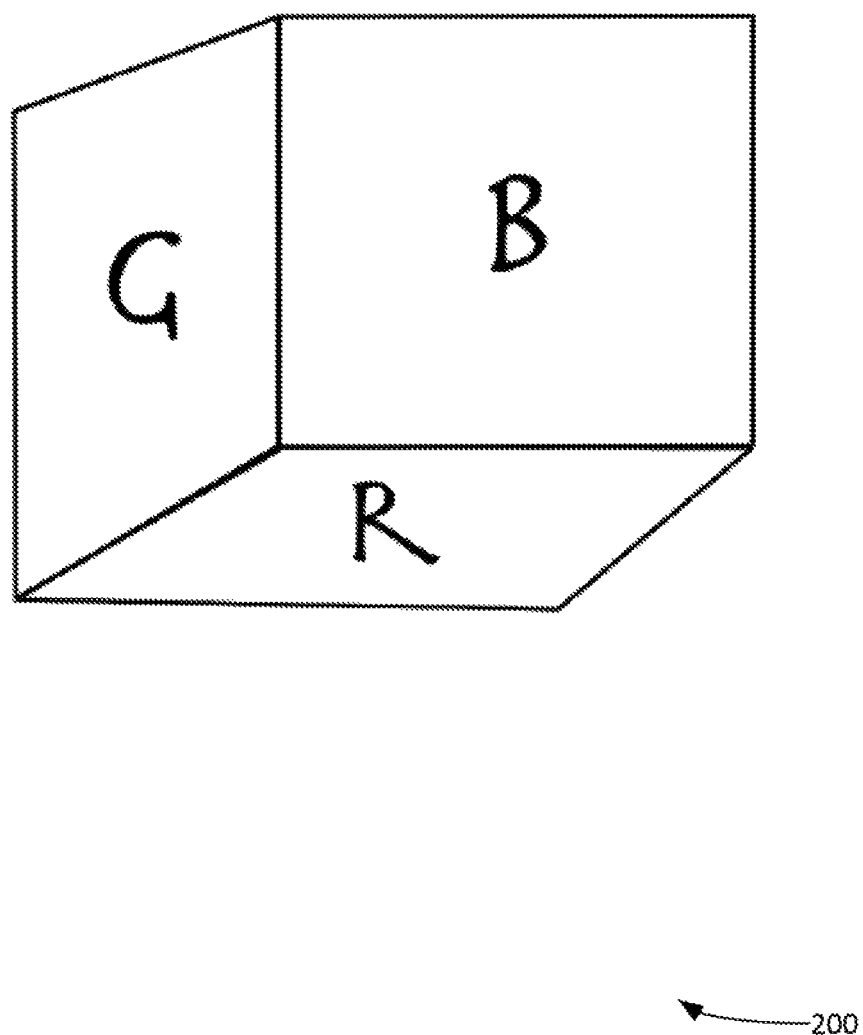
FIG. 2 is a perspective of an individual multi-camera device, according to some embodiments.

FIG. 2 shows an embodiment of a multi-camera device 200 that may be calibrated using the present invention. This particular embodiment is a stereoscopic camera that has two image modules and fisheye lenses on each. Due to minor mechanical differences between manufactured cameras, the two lenses of a given device may have slightly different relative distance between them, or slightly different relative yaw, pitch, or roll, then another camera. The stereoscopic calibration process measures these differences and allows software to correct differences in each camera's mechanical manifestation.

Figure 4:
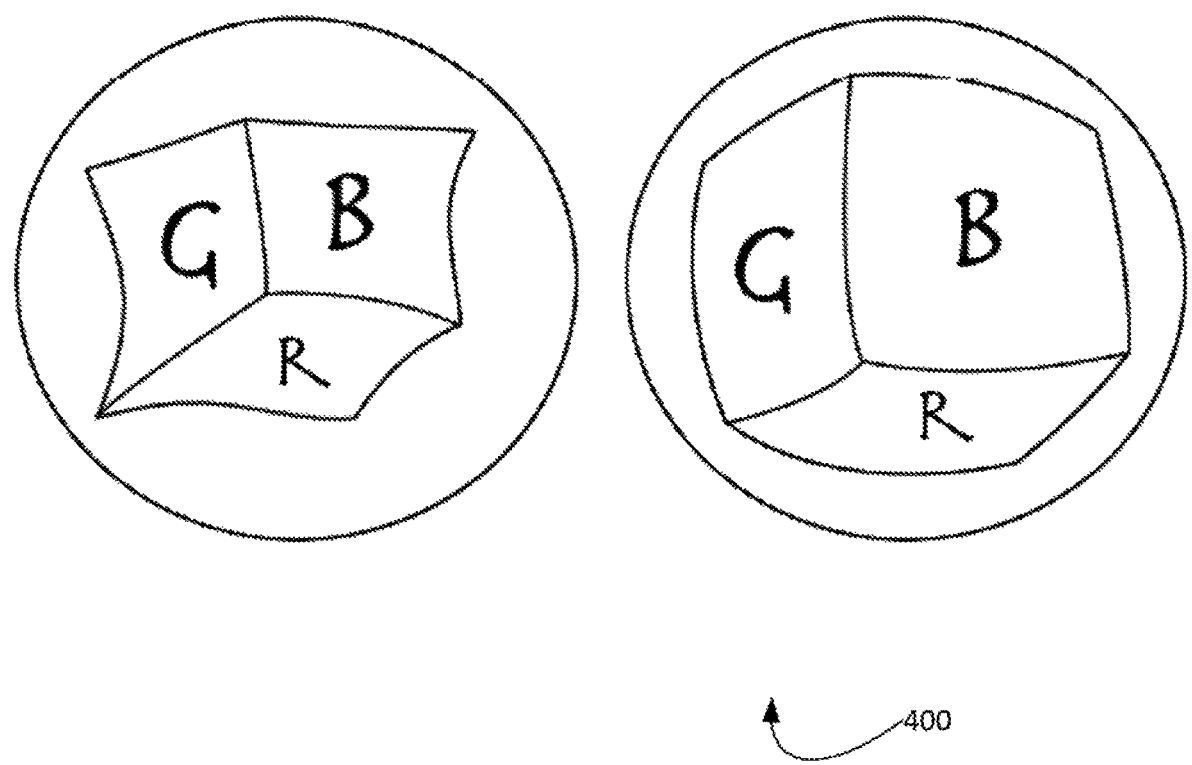
FIG. 4 is a view illustrating a recorded stereoscopic image with the non-planar calibration target, according to some embodiments.

FIG. 4 shows an embodiment of a captured stereoscopic image 400 of a non-planar calibration target from a stereoscopic camera. Note that there can be a disparity in the location of the target between the left and right images. This can be due to a difference in perspective between the two cameras. The stereoscopic calibration software can measure the locations of the calibration target in each image pair and use the disparities to compute an estimate of the stereoscopic camera calibration parameters.

Non-Planar Calibration Target

Figure 3:
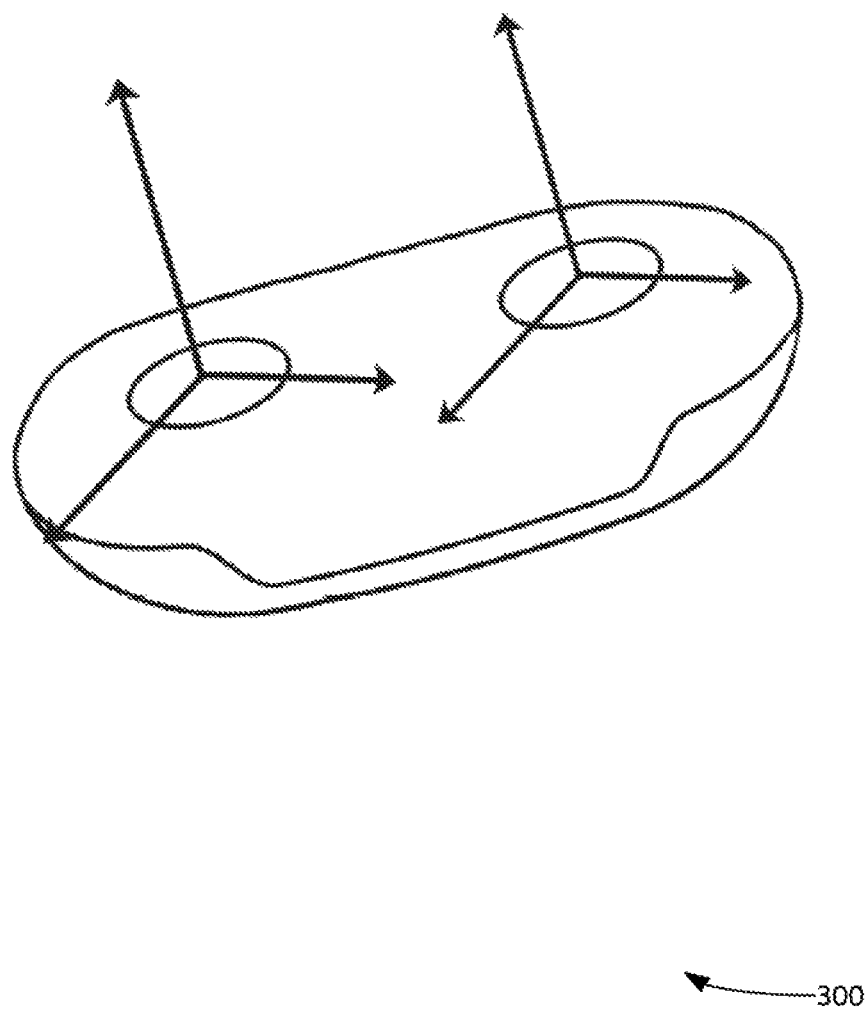
FIG. 3 is a perspective of a non-planar calibration target, according to some embodiments.

FIG. 3 shows an embodiment of a non-planar camera calibration target 300. In this embodiment, there are three constituent planar targets, each of which is a checkerboard pattern. The planar targets in this embodiment form a pyramid shape and are distinguished by color. For example, the checkerboards on the three planar targets may be red, green, and blue to distinguish them. Alternate embodiments may use hue, markers, numbers, or other identifying marks to distinguish the constituent targets.

In this embodiment, the three constituent planar target checkerboards are all exactly the same size. When captured by a multi-camera device, the three checkerboard patterns in each image can be treated as a single checkerboard in three different positions. Thus, by using the multi-planar target, the calibration system is able to record more than one orientation for in each captured image.

Changing Relative Orientation

Figure 5:
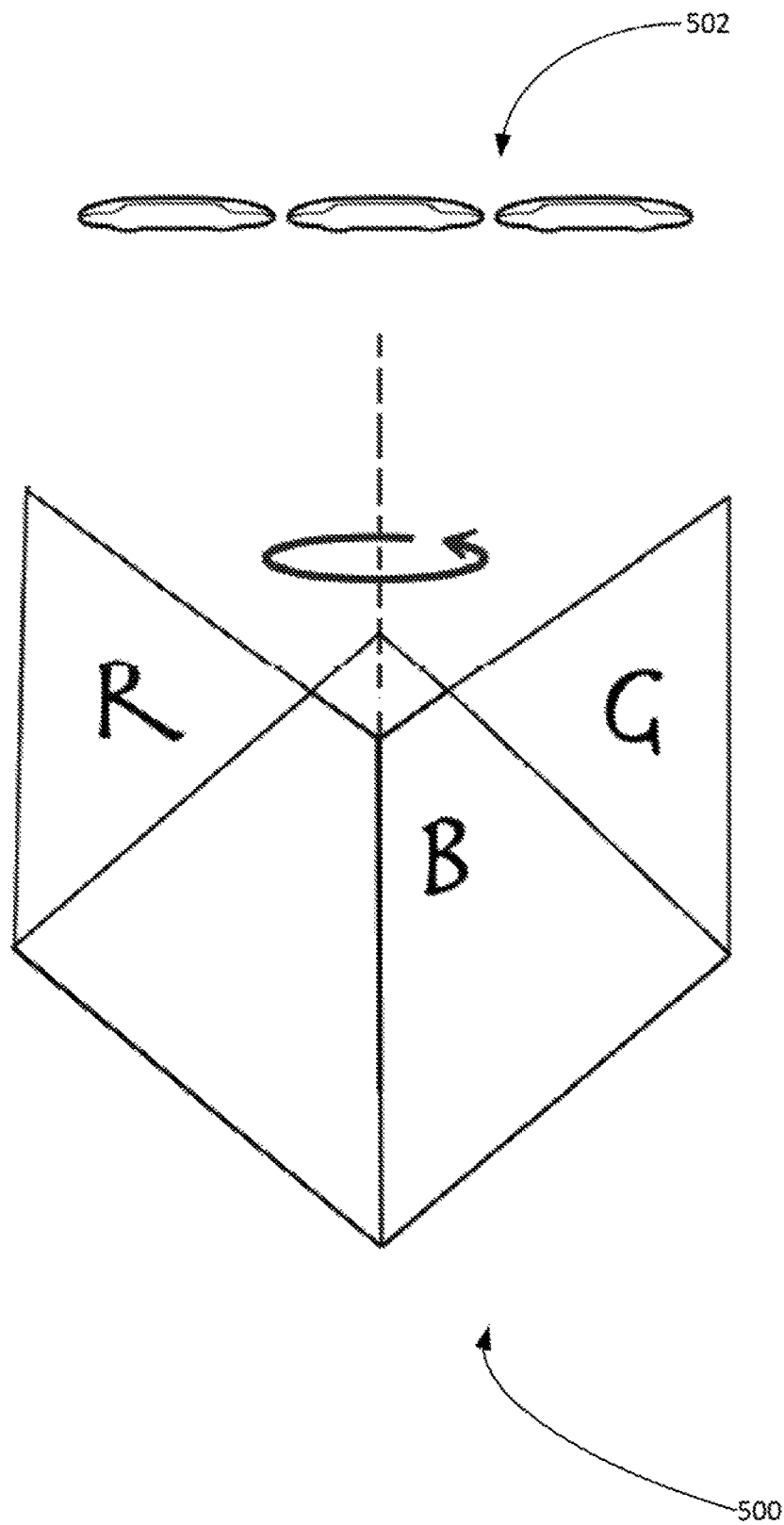
FIG. 5 is a perspective view showing more than one multi-camera device being calibrated simultaneously with a single non-planar calibration target, according to some embodiments.

FIG. 5 shows an embodiment that is able to implement calibration more than one multi-camera device at a time, according to some embodiments. The multiple cameras 502 can record images of the non-planar calibration target 500 as it moves and are able to compute the calibration parameters from the recorded images.

It is noted that FIG. 1 and FIG. 5 both illustrate example embodiments that use a rotating platform to move the non-planar calibration target relative to the cameras being calibrated. However, other embodiments are possible to generate recorded images with different relative orientations between the camera and calibration target.

Figure 6:
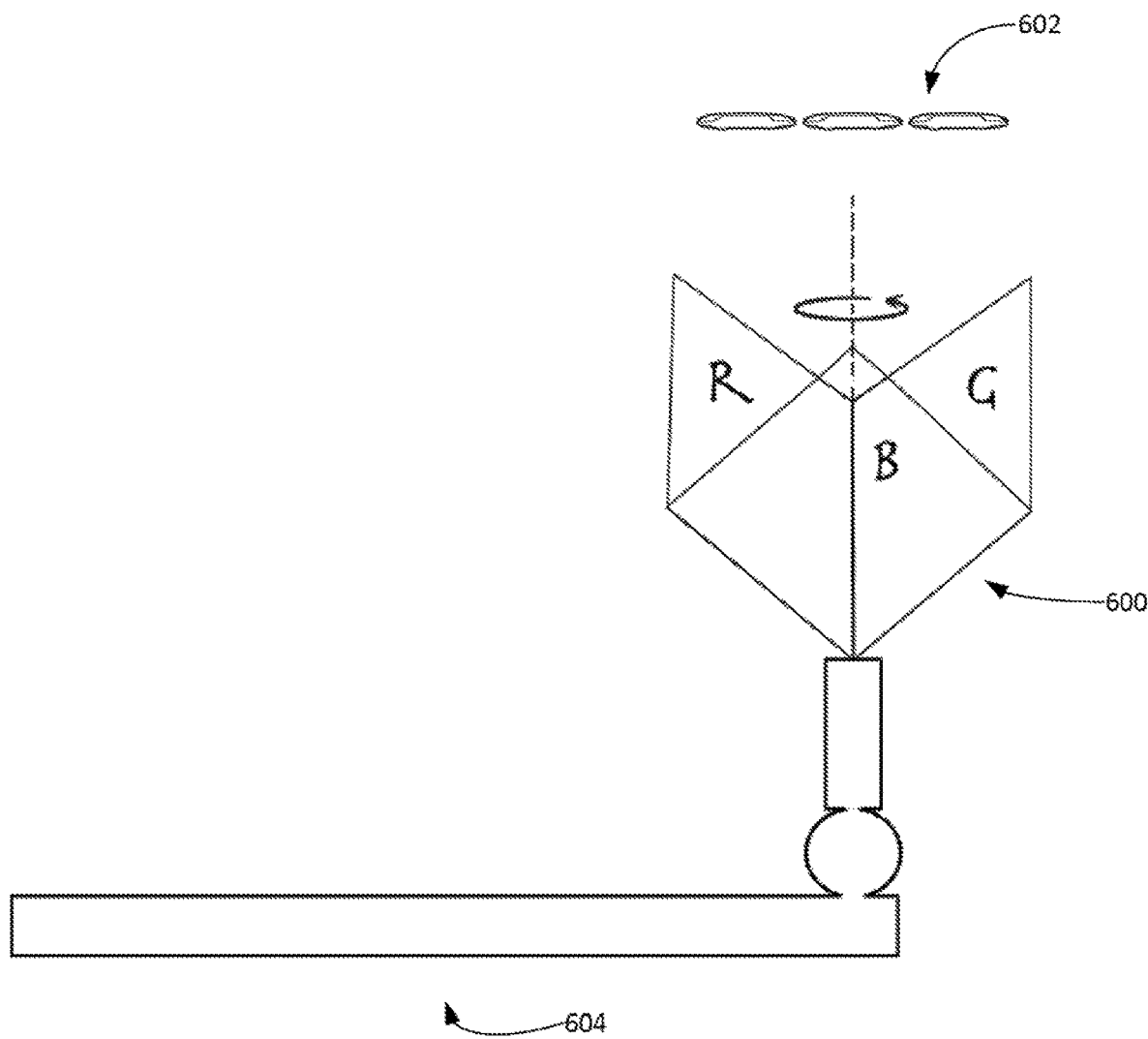
FIG. 6 is a perspective view showing an alternate embodiment of more than one multi-camera device being calibrated simultaneously with a single non-planar calibration target, according to some embodiments.
Figure 7:
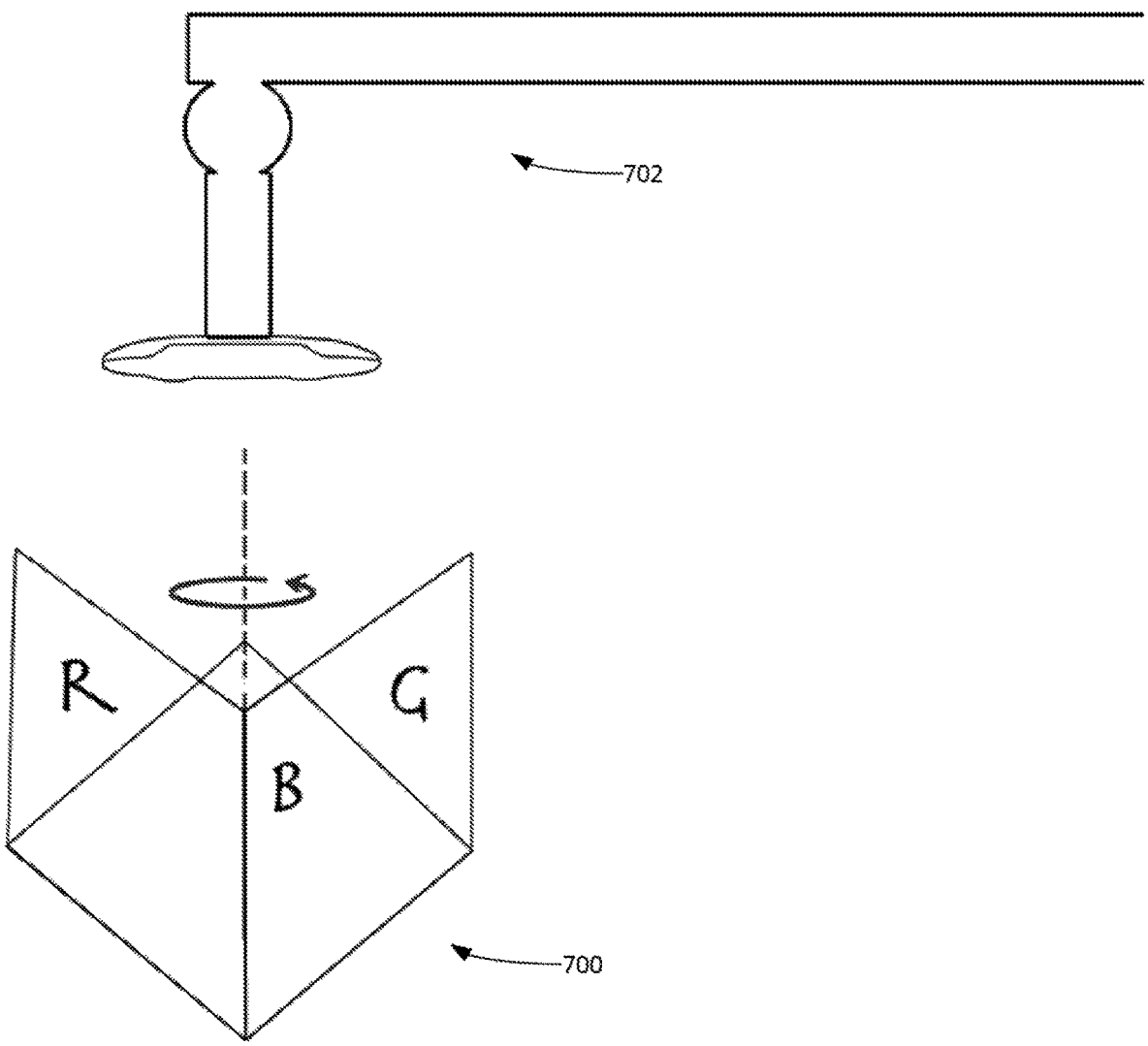
FIG. 7 is a perspective view showing a multi-camera device being calibrated while being mechanically re-oriented with a robotic arm, relative to a stationary non-planar calibration target, according to some embodiments.

FIG. 6 illustrates an embodiment where the calibration target 600 for multiple cameras 602 is being reoriented with a programmable mechanical arm 604, according to some embodiments. FIG. 7 illustrates an embodiment wherein the calibration target remains stationary, and the camera being calibrated is being reoriented on a programmable mechanical arm, according to some embodiments. These are just examples of how different relative orientations can be achieved.

Example Systems

Various embodiments can use an electrical device. It is a stereoscopic camera that captures one-hundred and eighty (180)-degree 3D images and videos by using two fish-eye lenses spaced apart at a distance similar to that of human eyes. The stereoscopic camera system can include the following elements, inter alia: two printed circuit boards (PCBs), each consisting of a digital image sensor and supporting electronics that capture images at a rate of thirty (30) frames per second; two fish-eye lenses use for the image sensors to capture images with a one-hundred and eighty (180)-degree field-of-view; a fixture to mount and position the centers of the two image sensors and lenses at a distance of two point five (2.5) inches from each other; a laptop (and/or other computing devices) with digital storage and software to store and replay the image streams; two USB three-point-zero (3.0) cables that connect the image sensor PCBs to a USB hub; a USB hub to connect and synchronize the image sensor PCBs with the laptop; two USB three three-point-zero (3.0) outlets to connect the image sensor PCBs to the USB hub; screws to mount the image sensor PCBs onto the fixture; etc.

The compact stereoscopic camera uses two fish-eye lenses to simultaneously capture video streams from two different perspectives, each with a one-hundred and eighty (180)-degree field of view. By using specialized software and a virtual reality headset, the photos and videos captured by the camera can be played back, giving the user a realistic illusion of being immersed into the video or image. With this set-up, the user can use natural head motions to look freely in different directions, at different parts of the image or video within the one-hundred and eighty (180)-degree wide field. Accordingly, the stereoscopic camera can capture two images with a very large field of view. The camera does not need to combine multiple images into one, since the two images are shown separately to the user's eyes. In this way, visible seams between two images are avoided as the two images can be combined into a single image feed. Capturing two images instead of one and showing the two images to the individual eyes of the consumer creates an impression of the three-dimensionality of the captured image. Together with the field-of-view that is larger than the field-of-view of human vision, this can create a sense of presence in the consumer of the captured videos or photos. In comparison to camera systems that require more than two cameras, the invention is smaller, lighter and cheaper to produce.

Various views of an example stereoscopic camera are provided in FIGS. 8-11. It is noted that the illustrated size parameters are provided by way of example and not limitation. Other stereoscopic cameras systems can be implemented with other example size parameters.

In one example, an example stereoscopic camera system can include a camera prototyped with two fish-eye lenses at a horizontal distance of two point five (2.5) inches mounted on two image sensor PCBs with screws on a fixture which may be made of any sufficiently rigid and strong material such as high-strength plastic, metal, or the like. Both lenses are arranged in a way that they are parallel to each other, perpendicular to the mounting fixture, and face the same direction. The centers of the image sensor PCBs can be at the same two-point-five (2.5) inches distance from each other as the lenses. Both PCBs can have USB 3.0 ports and are connected through USB cables to a USB hub that combines the signals and forwards the image streams to the laptop for processing and storage.

The two-camera fish-eye lenses capture individual image streams with a field-of-view of one-hundred and eighty (180) degrees and send them to the laptop. When the laptop receives these images or streams of images, it directly stores them on its storage, in a form that associates, or synchronizes images from the two image sensors that were captured at the same moment.

To summarize the construction details of the prototype, two fish-eye lenses are each mounted on an image sensor PCB, creating individual camera prototypes. The two PCBs are then mounted on a fixture with screws, so they are in the physical configuration described above. The image sensor PCBs are connected through USB cables and a USB hub to the laptop. The laptop runs the software that records raw images and processes them for play back.

All described elements are necessary for the invention to work. To add additional functionalities, first, one or multiple microphones could be added to capture sound from multiple directions alongside the video stream. Second, the laptop can be replaced by a mobile phone and connected to the prototype to make the entire system more portable and cost-efficient in terms of components or stand-alone functions.

A use case for this invention would be to place the prototype somewhere or mount it to some object, facing the direction of the object or space to be recorded or taken as photos. Then run the software on the computer to capture either a video or photo of the objects in the field-of-view of the invention. Finally, the invention produces digital videos or photos with a 3D one-hundred and eighty (180)-degree view after raw frames are processed through the software on the computer.

The advantages of the present invention include, without limitation, that it is portable, exceedingly easy to transport, and allows simple capture of one-hundred and eighty (180)-degree 3D videos and photos with a traditional point-and-shoot method. It is easy to adjust and move the lightweight invention while video recording. Moving current devices typically requires more than just point-and-shoot, as three-hundred and sixty (360) panoramic stereoscopic cameras captures everything around them. Further, the invention creates videos that can be viewed through virtual reality headsets.

In broad embodiment, the present invention is a portable and user-friendly stereoscopic camera capturing one-hundred and eighty (180)-degree 3D videos by reducing current market solutions to the bare minimum and mimicking human vision and hearing.

Figure 8:
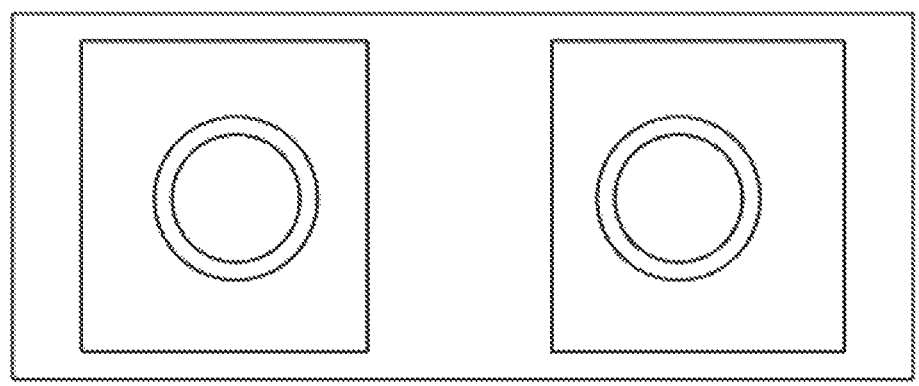
FIG. 8 depicts a front side perspective of a stereoscopic camera system, according to some embodiments.
Figure 9:
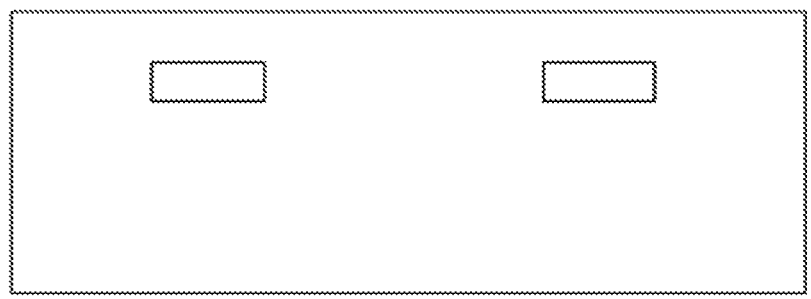
FIG. 9 is a backside view of a stereoscopic camera system, according to some embodiments.
Figure 9:
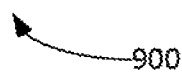
Figure 10:
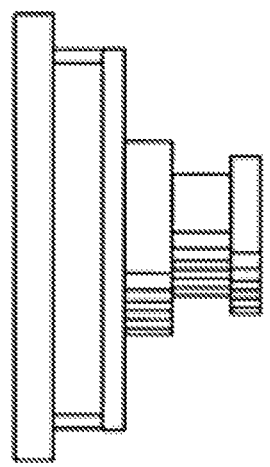
FIG. 10 is a right-side view of a stereoscopic camera system, according to some embodiments.
Figure 11:
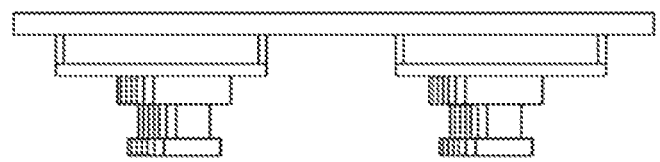
FIG. 11 is a top view of a stereoscopic camera system, according to some embodiments.

More specifically, FIG. 8 depicts a front side perspective of a stereoscopic camera system, according to some embodiments. FIG. 9 is a backside view of a stereoscopic camera system, according to some embodiments. FIG. 10 is a right-side view of a stereoscopic camera system, according to some embodiments. FIG. 11 is a top view of a stereoscopic camera system, according to some embodiments.

Figure 12:
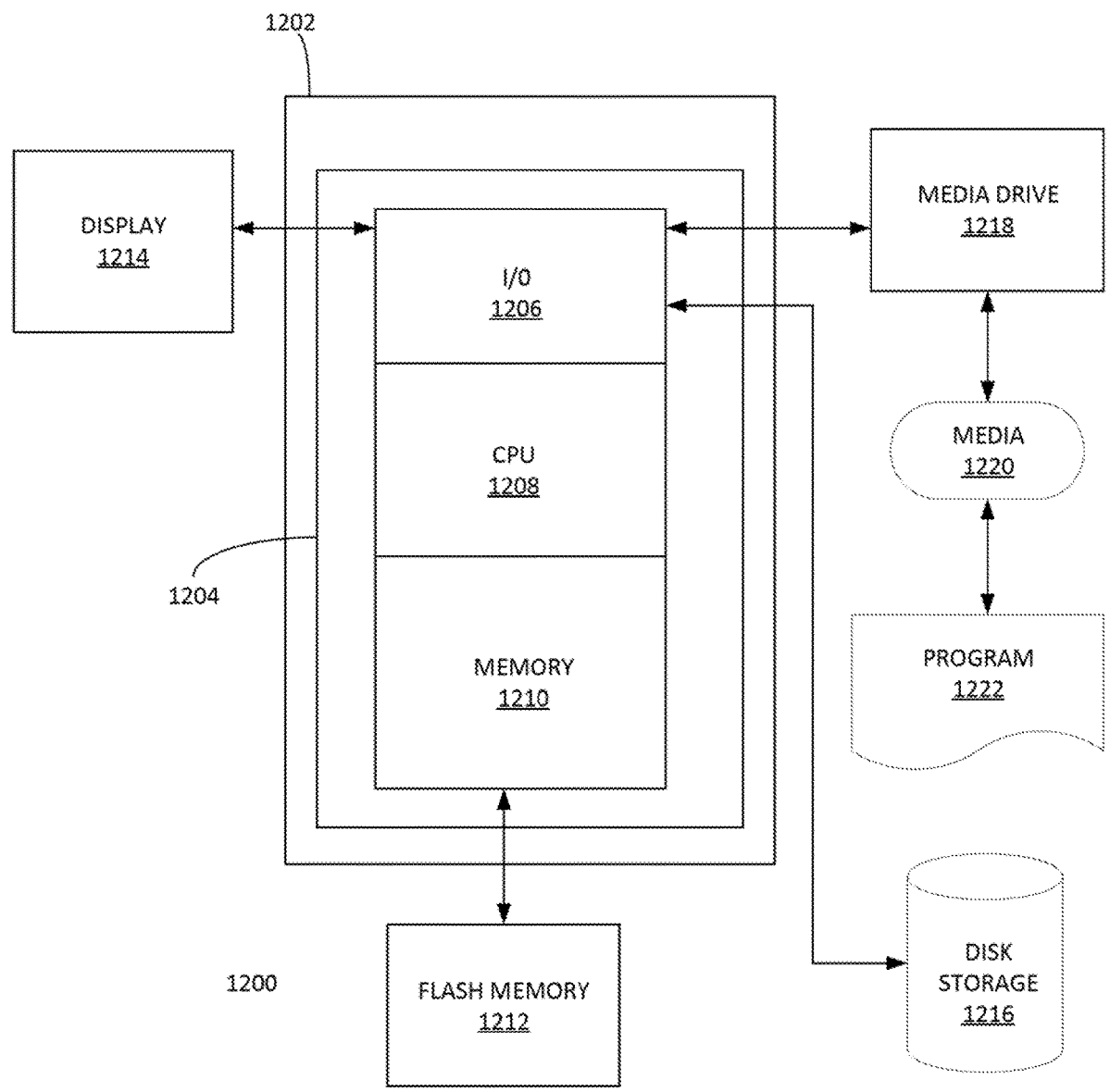
FIG. 12 depicts an exemplary computing system that can be configured to perform any one of the processes provided herein.

FIG. 12 depicts an exemplary computing system 1200 that can be configured to perform any one of the processes provided herein. In this context, computing system 1200 may include, for example, a processor, memory, storage, and I/O devices (e.g., monitor, keyboard, disk drive, Internet connection, etc.). However, computing system 1200 may include circuitry or other specialized hardware for carrying out some or all aspects of the processes. In some operational settings, computing system 1200 may be configured as a system that includes one or more units, each of which is configured to carry out some aspects of the processes either in software, hardware, or some combination thereof.

FIG. 12 depicts computing system 1200 with a number of components that may be used to perform any of the processes described herein. The main system 1202 includes a motherboard 1204 having an I/O section 1206, one or more central processing units (CPU) 1208, and a memory section 1210, which may have a flash memory card 1212 related to it. The I/O section 1206 can be connected to a display 1214, a keyboard and/or other user input (not shown), a disk storage unit 1216, and a media drive unit 1218. The media drive unit 1218 can read/write a computer-readable medium 1220, which can contain programs 1222 and/or data. Computing system 1200 can include a web browser. Moreover, it is noted that computing system 1200 can be configured to include additional systems in order to fulfill various functionalities. Computing system 1200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Additional Processes

Figure 13:
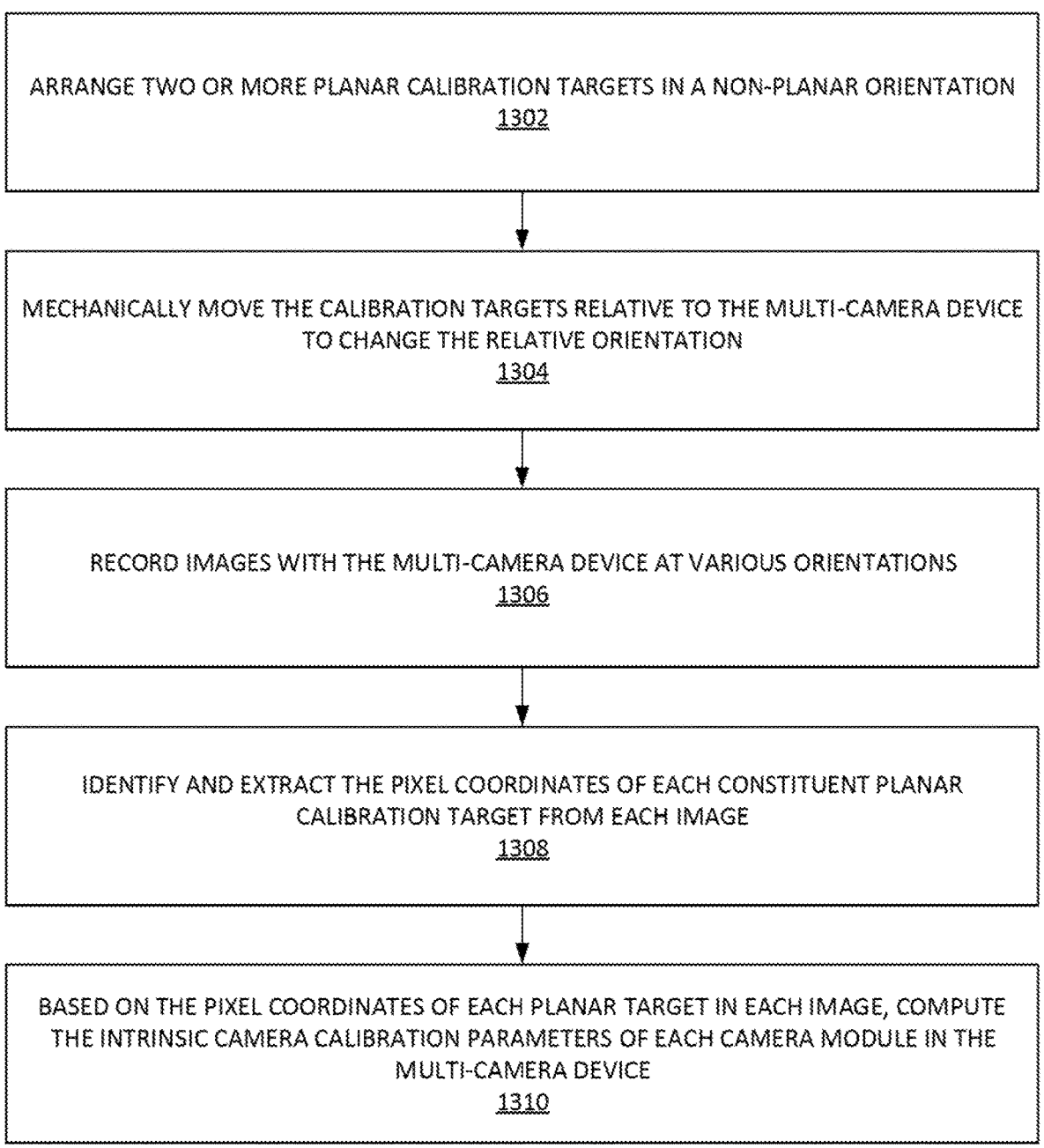
FIG. 13 illustrates an example process for calibrating a multi-camera device, according to some embodiments.

FIG. 13 illustrates an example process 1300 for calibrating a multi-camera device, according to some embodiments. In step 1302, process 1300 can arrange two or more planar calibration targets in a non-planar orientation. In step 1304, process 300 can mechanically move the calibration targets relative to the multi-camera device to change the relative orientation. In step 1306, process 300 can record digital images with the multi-camera device at various orientations. In step 1308, process 1300 can identify and extract the pixel coordinates of each constituent planar calibration target from each image. the pixel coordinates of each planar target in each image. In step 1310, process 1300 can, based on the pixel coordinates of each planar target in each image, compute the intrinsic camera calibration parameters of each camera module in the multi-camera device.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A system of calibrating a multi-camera device, comprising:
   a. Three planar calibration targets, arranged in a non-planar orientation;
   b. Mechanically moving the three planar calibration targets relative to the multi-camera device to change the relative orientation;
   c. Recording images with the multi-camera device at various orientations, wherein the recorded images contain one or more of the three planar calibration targets;
   d. Identifying and extracting the pixel coordinates of each three planar calibration targets from each image, and wherein multiple patterns of the pixel coordinates of the three planar calibration targets are recorded as if the multiple patterns are the same target, and
   wherein one or more multi-camera devices record calibration images as the non-planar calibration target moves relative to all of the multi-camera devices simultaneously,
   wherein the three planar calibration targets are distinguished from one other based on color.

2. The system of claim 1, wherein the pixel coordinates of each planar target in each image are used to compute the intrinsic camera calibration parameters of each camera module in the multi-camera device.

3. The system of claim 2, wherein the pixel coordinates of each planar target in each image and the computed camera intrinsic parameters are used to compute one or more stereoscopic camera calibration parameters.

4. The system of claim 3, wherein the multi-camera device is a stereoscopic camera, where each of the two camera modules contains a fisheye lens.

5. The system of claim 1, wherein the one or more multi-camera devices being calibrated remain stationary, as the non-planar target is rotated around a fixed axis as the camera capture the calibration images.

6. The system of claim 1, wherein the cameras, calibration targets, and mechanism for moving the cameras relative to the targets are all contained in a light box.

7. The system of claim 6, wherein the constituent planar calibration targets are distinguished from one other by analyzing the recorded images in the RGB color-space, the HSV color-space, or the YUV color-space.

8. The system of claim 7, wherein the constituent planar calibration targets are distinguished from one another based on characteristic markers, patterns, size, or shape.

9. The system of claim 1, wherein during the calibration process, not all of the constituent planar calibration targets need to be fully visible in every camera's image frames.

10. The system of claim 1, wherein the calibration targets and multi-camera devices are mechanically moved relative to each other by using a programmable robotic arm.

11. The system of claim 1, wherein the process of recording images on each multi-camera device continues until a minimum threshold of a calibration accuracy metric is achieved, during which process the calibration parameters and the calibration accuracy are periodically recomputed to test the accuracy.

12. The system of claim 1, wherein the stereoscopic calibration parameters include relative yaw, pitch, or roll between the two or more camera modules, or the stereoscopic calibration parameters include the stereoscopic essential matrix, stereoscopic fundamental matrix, or rotation matrix between two or more camera modules.

13. The system of claim 1, wherein the recorded images are used to perform color or contrast calibration between two or more camera modules in the multi-camera device.

14. A system of calibrating a multi-camera device, comprising:
   a. Three planar calibration targets, arranged in a non-planar orientation;
   b. Mechanically moving the three planar calibration targets relative to the multi-camera device to change the relative orientation;
   c. Recording images with the multi-camera device at various orientations, wherein the recorded images contain one or more of the three planar calibration targets;

d. Identifying and extracting the pixel coordinates of each three planar calibration targets from each image, and wherein multiple patterns of the pixel coordinates of the three planar calibration targets are recorded as if the multiple patterns are the same target.

* * * * *